United States Patent [19]

Netravali

[11] Patent Number: 4,488,175

[45] Date of Patent: Dec. 11, 1984

[54] DPCM VIDEO SIGNAL PROCESSING TECHNIQUE WITH SPATIAL SUBSAMPLING

[75] Inventor: Arun N. Netravali, Westfield, N.J.

[73] Assignee: AT&T Bell Laboratories, Murray Hill, N.J.

[21] Appl. No.: 392,558

[22] Filed: Jun. 28, 1982

[51] Int. Cl.$^3$ .................... H04N 7/13; H03K 13/22
[52] U.S. Cl. .................................. 358/136; 375/27
[58] Field of Search ............ 358/133, 261, 136, 135; 375/33, 31, 30, 27

[56] References Cited

U.S. PATENT DOCUMENTS

| | | | |
|---|---|---|---|
| 3,439,753 | 4/1969 | Mounts et al. | 358/135 |
| 3,715,483 | 2/1973 | Limb et al. | 358/135 X |
| 3,824,590 | 7/1974 | Limb | 358/135 X |
| 4,047,221 | 9/1977 | Yasuda et al. | 358/136 |
| 4,077,053 | 2/1978 | Ishiguro | 358/136 |
| 4,144,543 | 3/1979 | Koga | 358/136 |
| 4,202,011 | 5/1980 | Koga | 358/136 |
| 4,218,703 | 8/1980 | Netravali et al. | 358/136 |
| 4,218,704 | 8/1980 | Netravali et al. | 358/136 |
| 4,229,820 | 10/1980 | Enomoto | 375/28 X |
| 4,232,338 | 11/1980 | Netravali et al. | 358/136 |
| 4,278,996 | 7/1981 | Netravali et al. | 358/136 |
| 4,437,119 | 3/1984 | Matsumoto et al. | 358/136 |

OTHER PUBLICATIONS

IEEE Trans. on Comm., vol. COM-26, No. 10; "Digital Standards Converter by Adaptive Intra-Frame Line Interpolation"; Kinuhata, pp. 1413-1419, Oct. 1978.
BSTJ, vol. 58, No. 3; "Motion Compensated TV Coding P+1"; Netravali and Robbins, pp. 631-670, Mar. 1979.
BSTJ, vol. 59, No. 7; "Interframe TV Coding Using Gain and Displacement Compensation"; Netravali, Robbins and Stuller, pp. 1227-1240, Sep. 1980.
IEEE Trans. on Information Theory, vol. IT-14, No. 3; "Data Compression Using Straight Line Interpolation"; L. D. Davisson, pp. 390-394, May 1968.
BSTJ, vol. 50, No. 1; "Exchange of Spatial and Temporal Resolution in Television Coding"; Pease and Limb, pp. 191-200, Jan. 1971.
IEEE Trans. on Comm. Tech., vol. COM-19, No. 6; "Variable Redundancy Removal Coders for Diff. Coded Video Telephone Sigs."; Chow, pp. 923-926, Dec. 1971.
IEEE Trans. on Info. Theory, vol. IT-23, No. 3; "Quantizers for DPCM Coding of Picture Signals"; Netravali, pp. 360-370, May 1977.

Primary Examiner—John C. Martin
Assistant Examiner—Victor R. Kostak
Attorney, Agent, or Firm—Barry H. Freedman

[57] ABSTRACT

When a DPCM encoded video signal is spatially subsampled in order to reduce the amount of information that must be transmitted, the values of nontransmitted picture elements (pels) must nevertheless be reconstructed at both transmitter and receiver. In accordance with the present invention, reconstructed values are obtained by interpolation between nearby transmitted elements only in unpredictable ones of the picture. In regions where prediction errors are low, the predicted value of a nontransmitted element is instead used as a basis for the reconstruction. Increased efficiency is thus achieved at little increase in complexity, since the same prediction required for DPCM encoding is used for reconstruction of nontransmitted pels.

16 Claims, 5 Drawing Figures

DPCM VIDEO SIGNAL PROCESSING TECHNIQUE WITH SPATIAL SUBSAMPLING

FIELD OF THE INVENTION

The present invention relates generally to video signal encoding and decoding and, in particular, to differential pulse code modulation (DPCM) encoding and decoding in which a spatial subsampling mode is used when a transmission buffer becomes full.

BACKGROUND OF THE INVENTION

DPCM coding of video signals has been improved by the use of variable length coders which assign code words of different lengths to each quantizer prediction error output, depending upon its expected frequency of occurrence. Because variable length coding generates data at an uneven rate, buffers must be provided at both transmitter and receiver so that information can be transmitted at a constant bit rate on the interconnecting communication channel. The buffer smooths the coder output data rate by reading data at a variable rate while writing data at a regular rate dictated by channel capacity. In order to avoid overflow, buffer fullness is typically sensed and used to adaptively control the DPCM coder, for example, by changing the quantizer characteristics (see U.S. Pat. No. 4,077,053 issued to T. Ishiguro on Feb. 28, 1978) or by interposing a variable characteristics filter in the DPCM coder input (see U.S. Pat. No. 4,047,221 issued to H. Yasuda et al on Sept. 6, 1977). Buffer overflow can also be controlled by resorting to spatial and/or temporal subsampling so that the volume of data that must be processed is reduced in picture areas which generate large prediction errors.

When spatial subsampling is used in DPCM coding, information describing the nontransmitted picture elements must nevertheless be computed at the receiver, for display purposes. Nontransmitted pels must also be reconstructed at the transmitter, since both the transmitted and nontransmitted pels are normally used in predicting the values of subsequent pels. Reconstructed values for nontransmitted pels have typically been derived by interpolation, using the reconstructed values of neighboring transmitted picture elements. This is adequate in many instances, as where there is motion or a high degree of spatial detail in the picture. However, since interpolation is an averaging process, it produces noticeable blurring in flat or stationary picture areas, which is often highly objectionable.

SUMMARY OF THE INVENTION

Blurring associated with interpolative reconstruction of the values of nontransmitted picture elements in a spatially subsampled DPCM encoded video signal is avoided by an adaptive technique which uses interpolative reconstruction only in unpredictable picture areas. In picture areas where the video signal can be accurately predicted (e.g., stationary areas with little spatial detail), the reconstructed value is instead derived by prediction. Since the DPCM encoder already includes a predictor, a significant benefit can be derived with a minimum increase in processing complexity.

BRIEF DESCRIPTION OF THE DRAWING

The present invention will be more readily appreciated by consideration of the following detailed description when read in light of the accompanying drawing in which.

DETAILED DESCRIPTION

Figure 1:
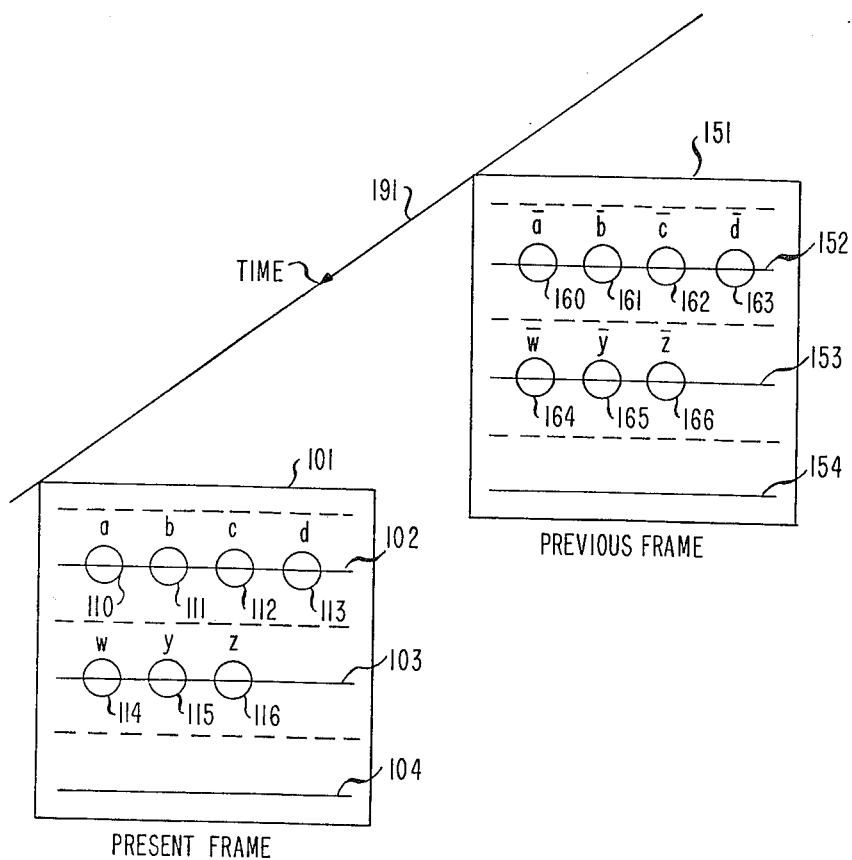
FIG. 1 is an illustration of two frames of a television picture to be processed, showing the relative locations of picture elements within the frames.

In order to fully appreciate the manner in which values for nontransmitted picture elements are reconstructed in a spatially subsampled DPCM video signal processing system, the manner of initially processing and the notation for representing a video signal must be understood. Referring to FIG. 1, rectangle 101 represents the outer boundaries of a present frame of the picture being processed, and rectangle 151 represents the boundaries of a previous frame of the same picture. Arrow 191 represents the direction in which time is proceeding, illustrating that frame 101 follows frame 151. Under most conditions, processing in accordance with the present invention occurs on a frame-to-frame basis, with $\tau$ representing the time between frames, usually $1/30^{th}$ second. However, under some conditions where low resolution is acceptable, some frames can be skipped, so that the time between frames used for processing purposes can be $n\tau$, where n is an integer.

Within each frame, a series of scan lines (102-104 in frame 101 and 152-154 in frame 151) represent the paths over which the original picture or image is scanned to generate the electrical signal which represents the picture. Each frame is normally scanned from left to right and from top to bottom, with 525 scan lines/frame being typical. In some instances, however, interlaced field scanning is used, whereby a first set of 263 scan lines is formed (usually in $1/60^{th}$ of a second) and then a second set of 262 interlaced scan lines (shown dotted in FIG. 1) is formed; the spatial position of a scan line in a field is in the middle of the spatial position of scanning lines in either of its two adjacent fields. Where interlaced scanning is used, the present invention will generally operate on alternate fields (e.g., odd fields), so that picture elements in identical spatial locations are available. The remaining fields are processed identically. As an example, if the fields ae consecutively numbered 1, 2, 3 . . . n, n+1, n+2, . . . N, field n+2 is processed using predictors formed from field n. Field n+3 is processed using predictors from field n+1.

Within each of the frames 101, 151 of FIG. 1, circles 110–116 and 160–166 represent, respectively, the locations of picture elements (pels) which correspond to instants at which the video signal is sampled. Specifically, in frame 101, pels 114–116 lie along scan line 103, and pels 110–113 lie along the preceding scan line 102. For notation purposes, pel 116 is considered the presently processed pel, and is designated pel z; the preceding pel 115 on the same scan line is designated pel y, and pel 114 is designated pel w. The pel 112 on the scan line 102 preceding the present scan line 103 which is directly above the presently processed pel is designated pel c, with the preceding two pels 110, 111 designated pels a and b, respectively. The pel 113 following pel c is designated pel d. Using this notation, the intensity value of the presently processed pel is $I_z$, the intensity value of the immediately preceding pel is $I_y$, the intensity value of the pel delayed one line interval from the present pel is $I_c$ and so on. These intensity designations, it is to be understood, represent only the relative spatial positions of some of the pels in a frame. As processing proceeds, each pel will become the "presently processed pel z" and pels a–d, w and y will have the same relative spatial positions as shown in FIG. 1.

In the previous frame 151, the letter designations of the pels corresponding to those in frame 101 are the same. However, a bar "—" is placed over each letter to distinguish the time delay by $\tau$, the interframe delay time. For example, the intensity value for the pel in the previous frame which spatially corresponds to the presently processed pel is $I_{\bar{z}}$ and the intensity value for the pel in the corresponding location of pel c in frame 101 is denoted $I_{\bar{c}}$.

Figure 2:
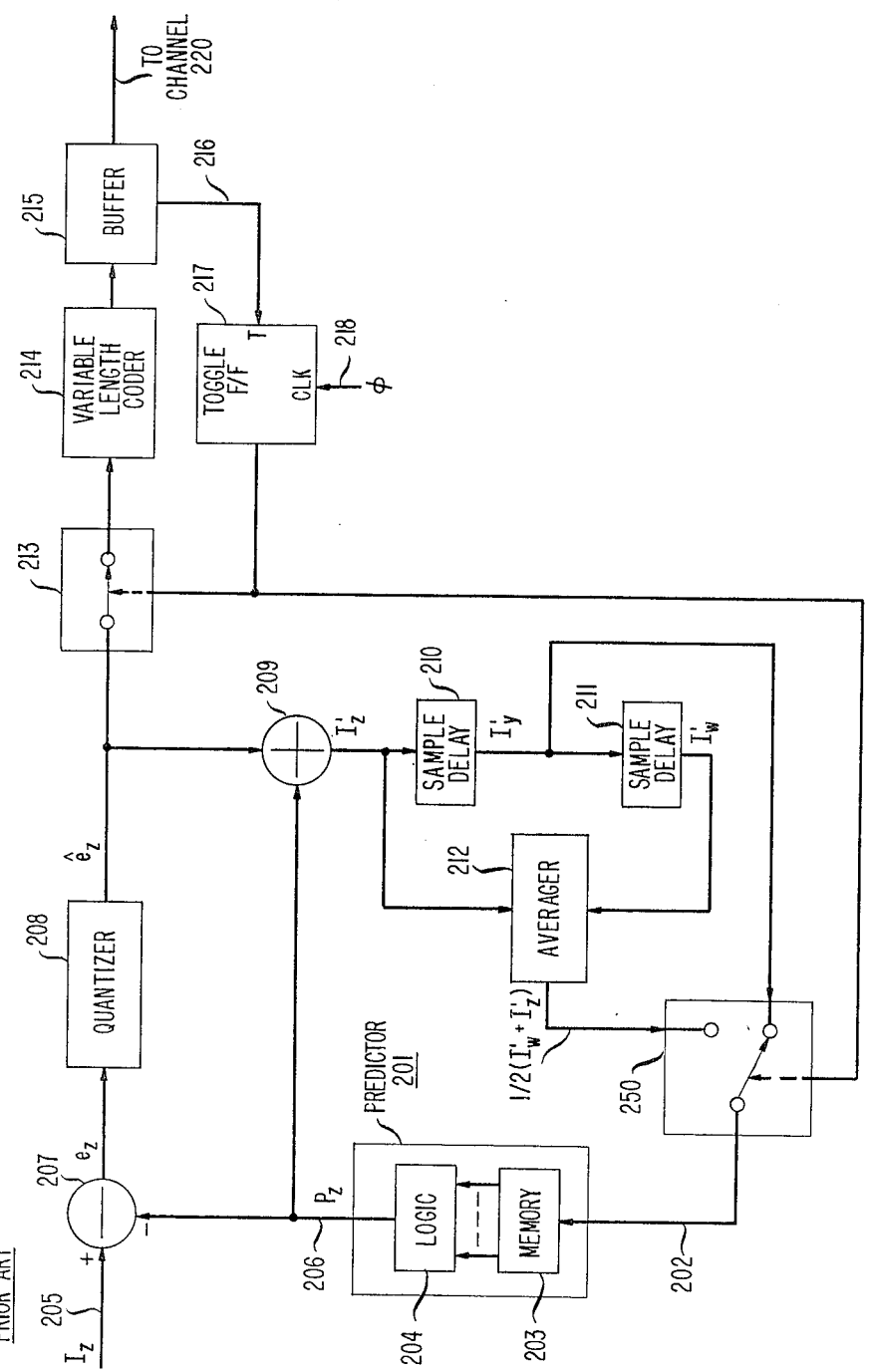
FIG. 2 is a block diagram of a prior art transmitter including a DPCM video encoder which includes circuitry for spatial subsampling and interpolative reconstruction.

FIG. 2 illustrates a prior art DPCM encoder arranged to reconstruct the values of nontransmitted picture elements in a spatially subsampled video signal by interpolation. At the heart of the encoder is a predictor 201 which generates a predicted version of the intensity value $I_z$ of the processed picture element z. Predictions may be made using numerous prior art techniques such as intraframe or interframe prediction or the more sophisticated motion or gain compensated predictors respectively described in "Motion-Compensated Television Coding", Part 1, by A. N. Netravali and J. D. Robbins, *Bell System Technical Journal*, March 1979, pp. 629–668, or "Interframe Television Coding Using Gain and Displacement Compensation" by J. A. Stuller, A. N. Netravali and J. D. Robbins, *Bell System Technical Journal*, September 1980, pp. 1227–1240. Interframe predictions are typically a function of the reconstructed values of several previously processed pels in the previous frame (such as pels 160–166) stored in memory 203, which may be combined by logic 204 in various ways, depending upon the type of prediction used. Intraframe predictions are typically a function of previously processed pels in the same frame (such as pels 110–115), which can also be combined by logic 204. In the case where a single pel is used as a predictor, logic 204 may be eliminated, and predictor 201 may include only a suitable delay element.

In order to code the intensity value $I_z$ of the present picture element applied on input line 205, the error or difference $e_z$ between the input value and the corresponding predicted value $P_z$ output from predictor 201 on line 206 is formed in a subtractor 207. The error is then quantized in quantizer 208 to produce a quantized error value $\hat{e}_z$ of desired precision which can then be coded using variable length coding. Quantizer 208 usually has non-linear step size characteristics so that small step sizes are used for small error values and larger steps are used for the "outer" quantizer levels. (See "On Quantizers for DPCM Coding of Picture Signals", by A. N. Netravali, *IEEE Trans. on Information Theory*, May 1977, pp. 360–370, for an example of quantizer step size selection.)

The quantized error value $\hat{e}_z$ is applied to a transmission channel 220 via a switch 213, a variable length coder 214 and a buffer 215, which provides a logic output on line 216 used to control the position of switch 213. When buffer 215 is not full, switch 213 is maintained in the position shown in FIG. 2, so that all quantized error values are coded and transmitted. To make efficient use of channel 220, coder 214 may be a variable length coder (e.g., a Huffman coder as described in "Variable-Length Redundancy Removal Coders for Differentially Coded Video-Telephone Signals", *IEEE Trans. on Communications Technology*, December 1971, pp. 923–926) arranged to generate short code words for most frequently occurring values and long code words for less frequent values of $\hat{e}_z$. Buffer 215 accepts the output from coder 214 at a variable rate, but applies its contents to the channel at a uniform rate. When a predetermined degree of fullness in buffer 215 is detected, the control signal on line 216 is used to enter a spatial subsampling mode in which information describing only alternate picture elements is coded by coder 214 and applied to channel 220. Subsampling may be accomplished by coupling the control signal to a toggle circuit 217, so that switch 213 is repositioned at every other occurrence of a sample clock signal $\phi$ applied on line 218. By deriving the clock signal $\phi$ from the input signal on line 205, switch 213 is opened for every other input sample, and the encoder of FIG. 2 provides 2:1 spatial subsampling. If the internal arrangement of toggle 217 is appropriately altered, different subsampling schemes (e.g. 3:1 and 3:2 subsampling whereby information regarding 1 out of 3 or 2 out of 3 pels (respectively) is encoded) can also be effected.

When the encoder of FIG. 2 operates in a 2:1 spatial subsampling mode, intensity values of nontransmitted pels must nevertheless be reconstructed at the receiver, so that an accurate version of the original picture can be displayed or stored for future use. While different techniques are used for reconstructing transmitted and nontransmitted pels, the *same* process of reconstruction must be used in both the encoder and decoder to insure the predicted values generated at both locations will correctly track.

With respect to transmitted pels, reconstructed values are formed by combining the predicted value $P_z$ output from predictor 201 on line 206 with the corresponding quantized error value $\hat{e}_z$ output from quantizer 208, using an adder circuit 209. The resulting sum (designated with a prime symbol to indicate a reconstructed value) is applied to the input 202 of predictor 201 via a one-sample period delay element 210 and a switch 250 when maintained in the position shown in FIG. 2. The one sample delay is used to enable interpolative reconstruction of nontransmitted pels as explained below. Because of this delay, pel y may be considered the present pel for "internal" reconstruction purposes while pel z is the present pel for transmission purposes.

To reconstruct the intensity values of nontransmitted picture elements, only information that is available at the receiver can be used. Conventionally, recovery is performed by spatial interpolation (averaging) of transmitted pel values, bringing into play a second one-sample delay element 211 which is serially connected to element 210. The purpose of delay elements 210 and 211 is to make the reconstructed values of transmitted picture elements on either side of a nontransmitted pel simultaneously available. These values are then interpolated by an averager circuit 212 and applied to predictor 201 via switch 250, which is repositioned under control of a signal from toggle 217. Thus, when the value $I'_y = P_y + e_y$ for a nontransmitted pel y (115 in FIG. 1) is present at the output of delay element 210, that value *cannot* be applied to predictor 201, since the value of $e_y$ is not transmitted and is not available at the receiver. Instead, the reconstructed values $I'_w$ and $I'_z$ for the neighboring transmitted pels 114 and 116 are simultaneously applied to averager 212, and the interpolated reconstructed value $\frac{1}{2}(I'_w + I'_z)$ is applied to predictor 201 via repositioned switch 250. When the next (transmitted) pel is processed, its reconstructed value $I'_z = P_z + \hat{e}_z$ appears at the output of delay element 210, and is coupled directly to predictor 201 via switch 215, positioned as shown in FIG. 2.

As stated previously, the encoder arrangement of FIG. 2 may be used with single element interframe or intraframe prediction where the intensity value for each pel is predicted by the reconstructed intensity value of a single picture element in the same or a previous frame. Single element prediction is achieved by eliminating logic 204 and arranging memory 203 to provide an overall delay which takes account of the one-sample delay provided by delay element 210. For example, to implement previous frame prediction, memory 203 should have a one frame less one-sample delay, so that the total delay between the input of delay element 210 and the output of predictor 201 is exactly one frame interval.

Figure 3:
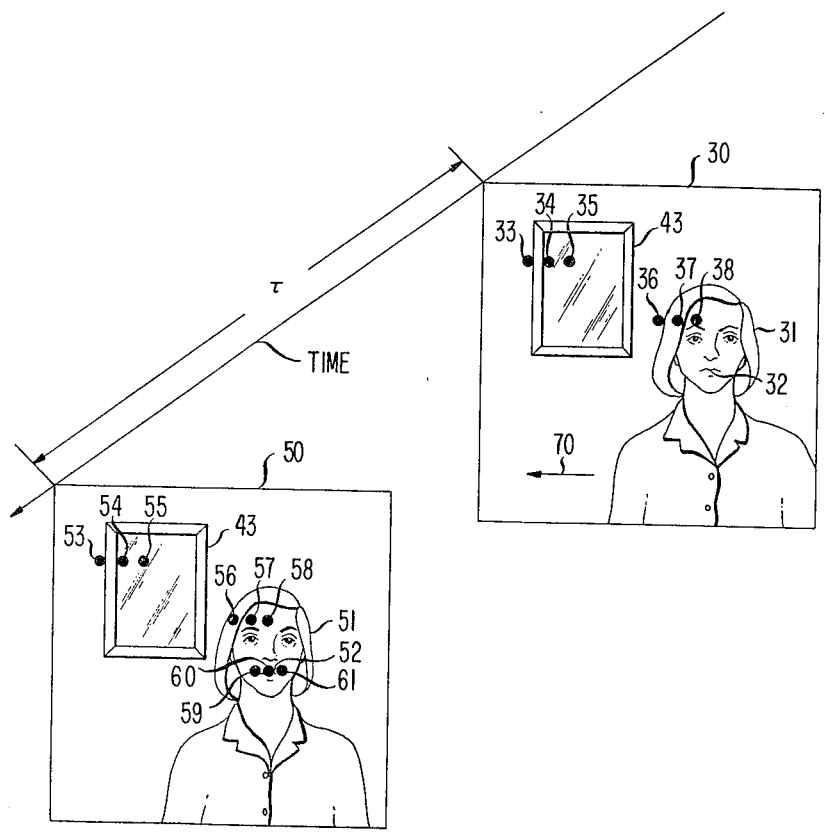
FIG. 3 graphically illustrates adaptive reconstruction of nontransmitted pels in accordance with the present invention.

While the interpolative reconstruction of nontransmitted pels provided by the encoder of FIG. 2 may be adequate in areas of the picture in which spatial detail is low, noticeable blurring occurs in many other instances, which can be highly objectionable. This is avoided, in accordance with the present invention, by adapting the technique used to reconstruct the value of nontransmitted pels as a function of the quantized prediction error value of the pel being processed, and, if desired, of other nearby pels. In particular, interpolative reconstruction of the value of nontransmitted pels as described above is used in areas of the picture in which the prediction error exceeds a predetermined threshold. In other areas, the value of the nontransmitted pel is *predicted* using the same predictor as is used for transmitted pels, and the average prediction error, obtained by interpolation using transmitted pel information, is then added to the prediction, yielding the desired reconstructed value. This arrangement is graphically illustrated in FIG. 3, which depicts previous and present frames 30 and 50, respectively, of a picture separated by time $\tau$. Both frames include a head and shoulders outline 31, 51 (respectively) which it is assumed has moved to the left, as shown by arrow 70, during the interframe interval, and lips 32, 52 within the head, which have also changed position. The remainder of each frame is background, and includes a stationary object 43.

When it is desired to encode the intensity values of picture elements in frame 50 using 2:1 spatial subsampling, the values of nontransmitted pels are normally recovered by interpolation, but this often produces blurring. For example, if pels 53 and 55 are transmitted, and the intensity of intervening pel 54 is reconstructed by interpolation, a portion of the edge of stationary object 43 becomes blurred. In accordance with the present invention, since the background area is usually predictable, a reconstructed value can instead be formed using the intensity of the spatially corresponding pel 34 in the previous frame 30. The latter value may itself have been similarly reconstructed (using pels 33 and 35), or pel 34 may have been a transmitted pel if the transition between ordinary DPCM encoding and subsampling occurred in the interval between frames 30 and 50.

When moving picture areas are involved, the particular prediction technique intended for use during encoding may or may not produce acceptable results, and a measure of prediction error is formed to determine whether or not reconstruction of the nontransmitted pel should be by prediction or interpolation. For example, nontransmitted pel 57 which is within head 51 may be predictively reconstructed using the (reconstructed) values of elements in frame 30 such as pel 38 (or others) with the particular combination and weighting of the pels selected for prediction being determined by the direction and amount of interframe displacement. On the other hand, nontransmitted pel 60 within lip area 52 may be much harder to predict even using motion compensation, and interpolation using pels 59 and 61 may be necessary, even though some blurring will occur.

Figure 4:
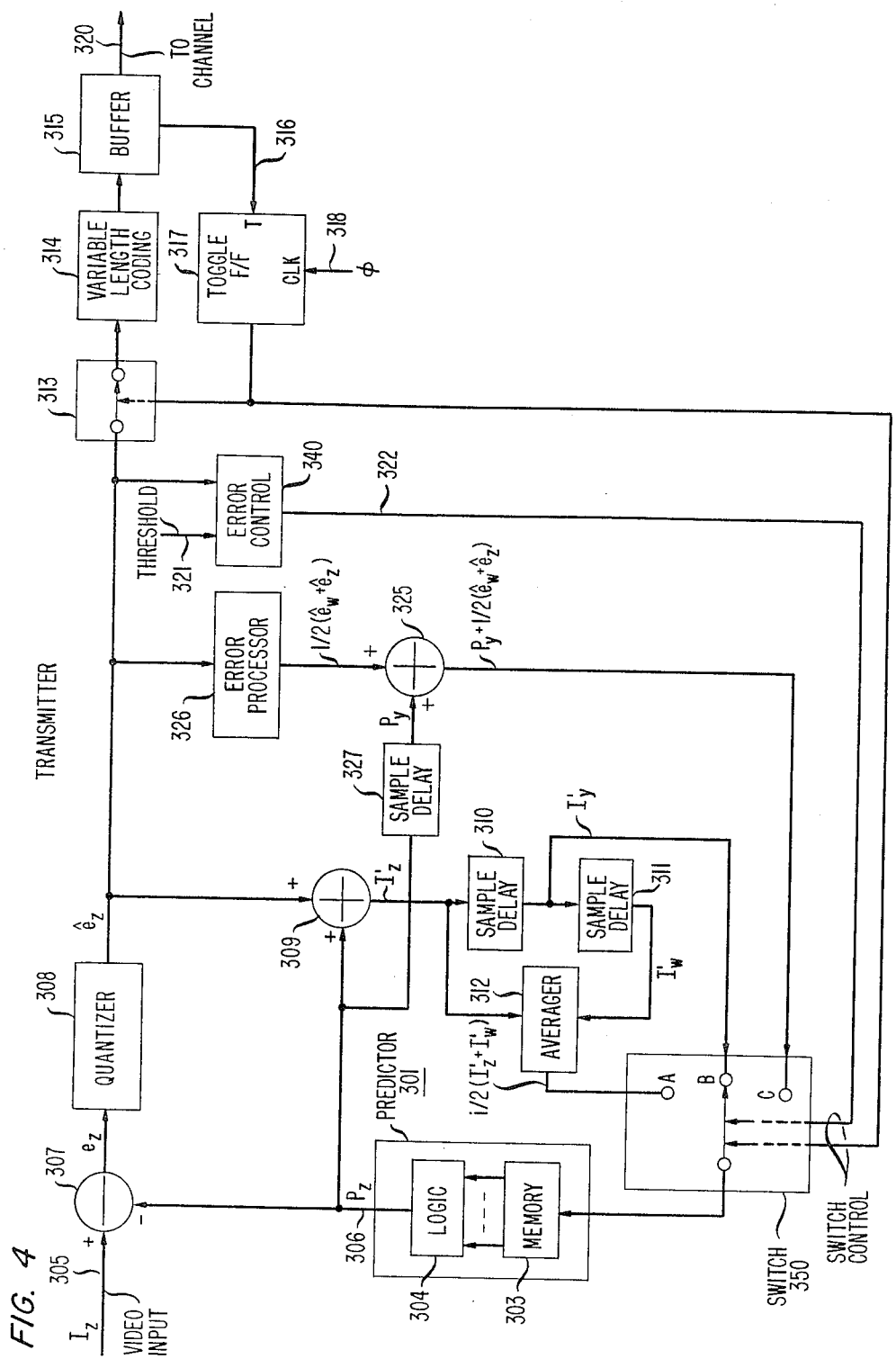
FIG. 4 is a block diagram of a transmitter including a DPCM encoder arranged in accordance with the present invention.

Adaptation, as described above, may be accomplished by arranging the encoder as shown in block diagram form in FIG. 4, wherein elements 301–318 perform the same functions as elements 201–218 of FIG. 2. The encoder also includes an error control circuit 340, which compares the magnitude of the quantized error $\hat{e}_z$ output from quantizer 308 with a predetermined threshold value applied on line 321. If the threshold is exceeded, a busy or rapidly moving picture area has been detected, since predictor 301 is unable to develop an accurate prediction $P_z$ of the current input $I_z$. In this event, the transmitter operates in the same manner as described above in connection with FIG. 2. Specifically, switch 350, which is jointly controlled by a signal output from circuit 340 on line 322 and an output from toggle 317, is alternately positioned so that a reconstructed value is obtained from the output of delay element 310 for transmitted pels and from the output of averager 312 for nontransmitted pels. On the other hand, when the error detected by error control circuit 340 is below the threshold value, a predictable picture area has been found. In this case, reconstructed values for transmitted pels are obtained (as before) from the output of delay element 310. However, in order to reconstruct the value of a nontransmitted picture element (e.g., pel y), its predicted value $P_y$, obtained from the output of predicted 301 via a one-sample interval delay element 327, is combined in adder 325 with an average error $\frac{1}{2}(\hat{e}_w + \hat{e}_z)$ for the neighboring pels w and z. This average is computed using an error processor 326 which receives its input from quantizer 308 and which typically includes a delay element, an adder and a shift circuit for effecting a divide-by-two operation.

The operation of switch 350, which can be implemented using readily available electronic data selections which couple an input signal to a desired one of several outputs, depending on the status of several control inputs, can be better appreciated by designating its positions A, B and C as shown in FIG. 4. As stated previously, to implement the reconstructive adaptation of the present invention, switch 350 is jointly responsive to control inputs received from toggle 317 and error control circuit 340. When the output from circuit 340 is high, indicating that the threshold is exceeded, switch 350 alternates between positions A and B (corresponding to interpolation and prediction, respectively), depending upon the output of toggle 317; transmitted pels are reconstructed in position B, and nontransmitted pels are reconstructed in position A. On the other hand, when the output from circuit 340 is low, indicating that the threshold is not exceeded, switch 350 alternates between positions B and C as toggle 317 operates via clock pulses $\phi$. In position C, nontransmitted pels are reconstructed by predicting the values and by adding an average error formed using neighboring (transmitted) pels.

The foregoing can be appreciated by comparing the mathematical representations of the signals used to reconstruct the values of nontransmitted pels when the threshold value on line 321 is and is not exceeded. For relatively low error values, reconstruction by prediction is given by the sum:

$$I'_y = P_y + \tfrac{1}{2}(\hat{e}_w + \hat{e}_z) \tag{1}$$

where the prediction $P_y$ is the output of delay element 327 and the average error for surrounding pels comes from error processor 326. For relatively high error values, reconstruction is by ordinary interpolation using:

$$I'_y = \tfrac{1}{2}(I'_w + I'_z) \tag{2}$$

Equation (2) can be rewritten as:

$$I'_y = \tfrac{1}{2}(P_w + P_z) + (\hat{e}_w + \hat{e}_z) \tag{3}$$

since each reconstructed value $I'_w$ and $I'_z$ for a transmitted pel is a sum output from adder 309. Comparison of equations (1) and (3) reveals that quantized prediction errors are averaged in both cases. In ordinary interpolation, (equation (3)) an *average* prediction is added to the average error, while the present invention (equation (1)) contemplates direct *prediction* of the intensity of the present pel y when the average error is small.

Figure 5:
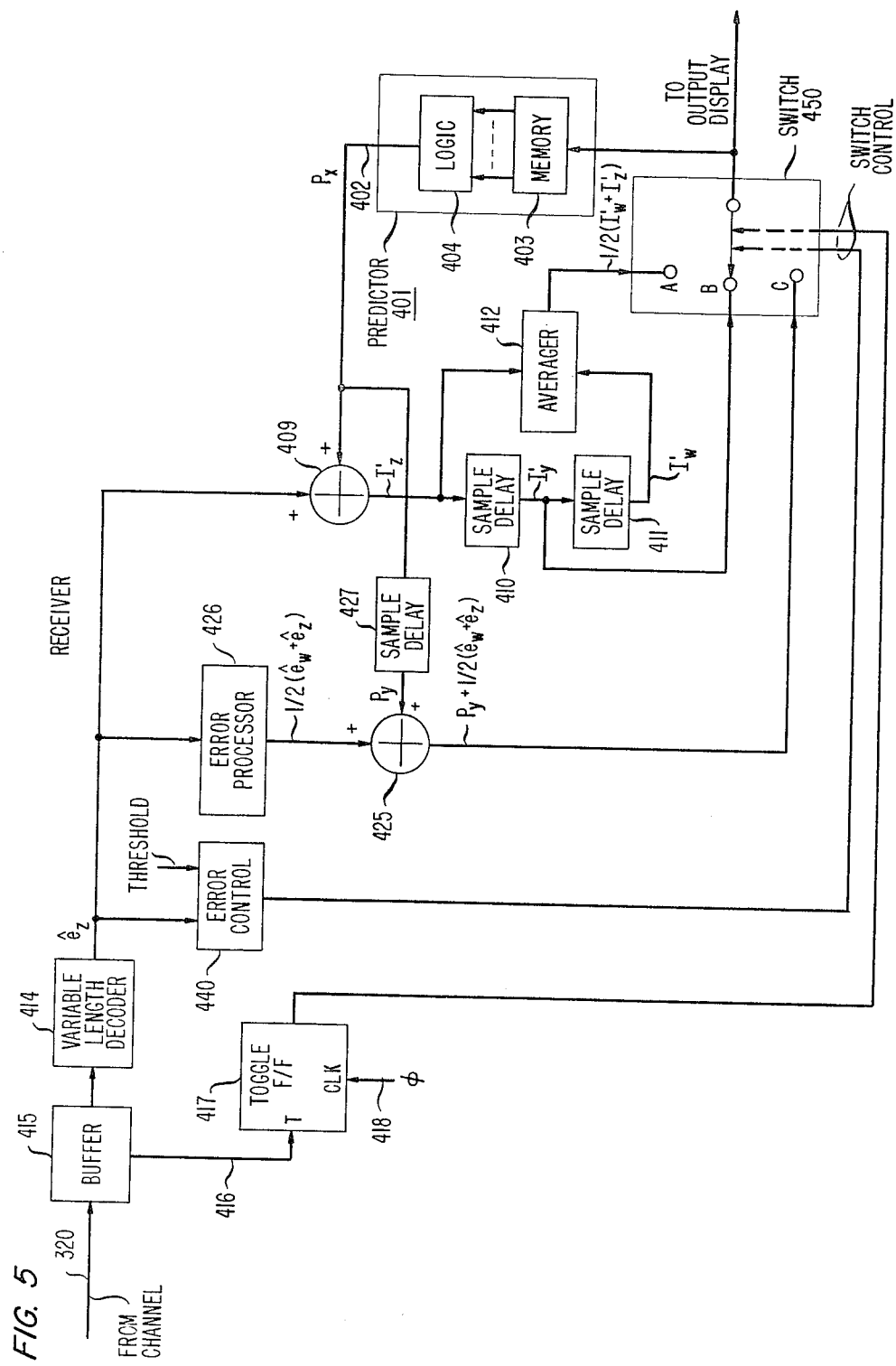
FIG. 5 is a block diagram of a corresponding receiver for decoding the output of the transmitter of FIG. 4.

Encoded information applied to channel 320 by the transmitter of FIG. 4 is decoded for application to a display or other utilization device by the receiver shown in block diagram in FIG. 5. As will be seen by comparison of FIGS. 4 and 5, the arrangement of the receiver is largely similar to that used in the transmitter. Incoming coded information received from channel 320 is applied to buffer 415, which like buffer 315 provides a control signal to toggle 417 on line 416 indicative of its fullness. Toggle 417, like its counterpart in FIG. 4, provides one control input to switch 450, while the second switch input is derived from error control circuit 440. When buffer 415 is below a predetermined capacity, switch 450 is maintained in position "B", and conventional DPCM decoding proceeds, as described below. When the fullness in buffer 415 indicates that spatial subsampling was used in the transmitter, toggle 417 is enabled, causing switch 450 to alternate either between positions A and B, or between positions B and C, at every other application of a pel clock signal $\phi$ on line 418. The mode of operation, as in the transmitter of FIG. 4, then depends upon the output generated by error control circuit 440, so that predictive decoding of nontransmitted pels is used when the errors are small and interpolative decoding of nontransmitted pels (positions A-B) is used otherwise.

In both modes, variable length encoded prediction error values are applied by buffer 415 to a variable length decoder 414 on an asynchronous basis, so that its decoded error values output occur at a desired regular rate. Three decoded error values are then added to predicted values for the corresponding picture elements in adder circuit 409. As in the transmitter of FIG. 4, predictions are made using information describing previously processed pels. The receiver of FIG. 5 accordingly includes a predictor 401 made up of a memory 403 and logic 404 which is identical to that used in predictor 301 in the transmitter.

As stated above, reconstruction of the intensity values of nontransmitted picture elements can be by interpolation or prediction, depending upon the output of error control circuit 440, which compares the quantized prediction error output from variable length decoder 414 with a threshold value applied on line 421. When interpolative reconstruction is selected, serially connected one-sample delay elements 401 and 411 are provided so that the intensity values for transmitted elements which surround a nontransmitted element are simultaneously available. In this mode, the intensity value for transmitted pels is recovered at the output of delay element 410. On the other hand, when predictive reconstruction is used, error processor 426, which receives a prediction error input from variable length decoder 414, provides an average of the prediction errors for picture elements which neighbor the nontransmitted pel. This average is added to the predicted value for the nontransmitted picture element, as generated by predictor 401 and output from one-sample delay element 427. Again, values of transmitted pels are recovered at the output of delay element 410. To summarize, when a spatial subsampling mode is used in predictable picture areas, switch 450 alternates between the "B" and "C" positions, thus reconstructing the values of nontransmitted pels by prediction. In unpredictable areas, interpolative reconstruction of nontransmitted pels is used.

The significantly improved performance capability of the present invention was verified by computer simulations. It is particularly noteworthy that a hardware implementation requires a minimal increase in complexity, since predictor 301 is required in a DPCM encoder and decoder whether or not the present invention is used, and the remaining additional circuit elements are easily provided at a relatively small cost.

Various adaptations and modifications may be made to the present invention by those skilled in the art, and for that reason the invention is to be limited only by the following claims. For example, while FIG. 4 illustrates error processor 326 as forming an average of two quantized prediction error values for transmitted pels which neighbor the present (nontransmitted) pel, a single prediction error value or more than two such values may instead be used, as long as the same information used in the transmitter will be available in the receiver. Multiple error values can be combined using many different memoryless transformations. In addition, while error control 340 is described as comparing the quantized error value for the present pel with a fixed threshold value, various adaptive techniques can be used to vary the threshold during processing. Also, the two-sample interpolation provided by delay elements 310 and 311 and averager 312 can be replaced by more complicated delay and arithmetic elements which combine other combinations of transmitted pels in a two-dimensional neighborhood surrounding the present element.

What is claimed is:

1. Apparatus for reconstructing the intensity values of nontransmitted pels in a spatially subsampled DPCM encoder, including:

means for predicting the intensity value of each pel as a function of at least one stored reconstructed intensity value for a previously processed pel, means for forming a quantized error value representing the difference between the intensity value of each pel and the predicted intensity value thereof, and means for forming reconstructed intensity values for transmitted pels by combining each predicted intensity value with the corresponding quantized error value, characterized in that said apparatus further includes:

first means operative to form the reconstructed intensity value for a nontransmitted pel by combining its predicted intensity value with the quantized error value of at least one neighboring transmitted pel.

2. The invention defined in claim 1 wherein said prediction means includes a memory for storing reconstructed intensity values for a plurality of previously processed pels and logic means for combining selected ones of said stored values.

3. The invention defined in claim 2 wherein said apparatus further includes second means operative to form the reconstructed intensity value for a nontransmitted pel by interpolating using reconstructed intensity values for neighboring transmitted pels, and means for selectively operating said first or said second means in response to said quantized error value.

4. A DPCM video encoder arranged to encode an error signal representing the difference between the intensity values of elements (pels) of a picture and corresponding predicted intensity values, including:

means for subsampling said error signal so as to encode error values for a subset of transmitted pels, means for reconstructing the intensity values of each of said transmitted pels by combining its error value with its predicted intensity value, and means responsive to a control signal for selectively reconstructing the intensity value of each of said nontransmitted pels by (1) interpolating reconstructed intensity values for neighboring transmitted pels, or (2) combining its predicted intensity value with an average error value for said neighboring transmitted pels.

5. The invention defined in claim 4 further including:

means for generating said control signal as a function of the magnitude of said error value for said each nontransmitted pel.

6. A DPCM encoder arranged to encode a video signal representing the intensity values of elements (pels) of a picture, including:

means for predicting the intensity value of each pel as a function of at least one stored reconstructed intensity value for a previously processed pel, means for subtracting said predicted intensity value for each pel from the true value thereof to generate an error value, means for encoding the error values for a subset of transmitted pels, and means for reconstructing the intensity value of each transmitted pel by combining its predicted value with the corresponding error value, characterized by means for adaptively reconstructing the intensity value of each nontransmitted pel as a function of its error value.

7. The invention defined in claim 6 wherein said adaptive reconstruction means includes:

(a) first means operative to reconstruct said intensity value of said each nontransmitted pel by interpolating between reconstructed intensity values for transmitted pels which neighbor each nontransmitted pel, and (b) second means operative to reconstruct said intensity value of said each nontransmitted pel by combining the predicted intensity value for each nontransmitted pel with an average error value for said neighboring transmitted pels.

8. The invention defined in claim 7 wherein said apparatus further includes means for operating said second means when said error value for said nontransmitted pel is below a threshold value.

9. A method of reconstructing the intensity values of nontransmitted pels in a spatially subsampled DPCM encoder, including the steps of:

predicting the intensity value of each pel as a function of at least one stored reconstructed intensity value for a previously processed pel, forming a quantized error value representing the difference between the intensity value of each pel and the predicted intensity value thereof, and forming reconstructed intensity values for transmitted pels by combining each predicted intensity value with the corresponding quantized error value, characterized in that said method includes the step of:

responsive to a first signal, forming reconstructed intensity values for each nontransmitted pel by combining its predicted intensity value with the quantized error value of at least one neighboring transmitted pel.

10. The method defined in claim 9 wherein said predicting step includes (a) storing reconstructed intensity values for a plurality of previously processed pels and (b) combining selected ones of said stored values.

11. The method defined in claim 10 further including the steps of:

responsive to a second signal, forming reconstructed intensity values for each nontransmitted pel by interpolating between reconstructed intensity values for neighboring transmitted pels, and generating said first or said second signal in response to said quantized error value.

12. A DPCM video encoding method for encoding an error signal representing the difference between the intensity values of elements (pels) of a picture and corresponding predicted intensity values, including the steps of:

subsampling said error signal so as to encode error values for a subset of transmitted pels, reconstructing the intensity values of each of said transmitted pels by combining its error value with its predicted intensity values, and selectively reconstructing the intensity value of each of said nontransmitted pels in response to a control signal by (1) interpolating between reconstructed intensity values for neighboring transmitted pels, or (2) combining its predicted intensity value with an average error value for said neighboring transmitted pels.

13. The method defined in claim 12 further including the step of:

generating said control signal as a function of the magnitude of said error value for said each nontransmitted pel.

14. A DPCM encoding method for encoding a video signal representing the intensity values of elements (pels) of a picture, including the steps of:
  predicting the intensity value of each pel as a function of at least one stored reconstructed intensity value for a previously processed pel,
  subtracting said predicted intensity value for each pel from the true value thereof to generate an error value,
  encoding the error values for a subset of transmitted pels, and
  reconstructing the intensity value of each transmitted pel by combining its predicted value with the corresponding error value, characterized by the step of:
  adaptively reconstructing the intensity values of each nontransmitted pel as a function of its error value.

15. The method defined in claim 14 wherein said adaptive reconstruction step includes:
  (a) interpolating between reconstructed intensity values for transmitted pels which neighbor each nontransmitted pel, and
  (b) combining the predicted intensity value for each nontransmitted pel with an average error value for said neighboring transmitted pels.

16. The method defined in claim 15 wherein said method further includes the step of selecting said last-mentioned step when said error value for said nontransmitted pel is below a threshold value.

* * * * *